United States Patent

Jayapalan et al.

[11] Patent Number: 5,561,844
[45] Date of Patent: Oct. 1, 1996

[54] MINIMIZATION OF FACSIMILE DATA LOSS DURING CELLULAR HANDOVER

[75] Inventors: Jay Jayapalan, Buffalo Grove; Steven Schatz, McHenry; Kamala Urs, Bloomingdale, all of Ill.

[73] Assignee: Motorola, Inc., Schaumburg, Ill.

[21] Appl. No.: 561,219

[22] Filed: Nov. 21, 1995

Related U.S. Application Data

[63] Continuation of Ser. No. 117,570, Sep. 7, 1993, abandoned, which is a continuation of Ser. No. 808,135, Dec. 16, 1991, abandoned.

[51] Int. Cl.$^6$ ........................................................ H04Q 7/32
[52] U.S. Cl. ........................... 455/33.2; 455/54.1; 379/60
[58] Field of Search .......................... 455/33.1, 33.2, 455/34.1, 51.1, 54.1, 54.2, 56.1, 62, 63; 379/59, 60, 100; 354/431, 442

[56] References Cited

U.S. PATENT DOCUMENTS

| | | | |
|---|---|---|---|
| 4,654,867 | 3/1987 | Labedz et al. | 455/51.1 |
| 4,697,281 | 9/1987 | O'Sullivan | 455/33.1 |
| 4,821,310 | 4/1989 | Lynk, Jr. et al. | 455/54.2 |
| 4,912,756 | 3/1990 | Hop | 455/33.1 |
| 5,018,022 | 5/1991 | Tatsumi | 358/441 |
| 5,021,890 | 6/1991 | Yoshida et al. | 358/437 |
| 5,095,531 | 3/1992 | Ito | 455/33.2 |
| 5,146,609 | 8/1992 | Tayloe et al. | 455/33.2 |

OTHER PUBLICATIONS

Patent Abstracts of Japan, JP59212040, Nov. 20, 1984, Seisakusho KK, Mobile Radio Communication System.
Yoshida et al., "*GIII–Facsimile Adapter for Cellular Mobile Telephone Using Error Control Scheme*", 40th IEEE Vehicular Technology Conference, pp. 75–79 (1990).

*Primary Examiner*—Reinhard J. Eisenzopf
*Assistant Examiner*—Thanh Le
*Attorney, Agent, or Firm*—Heather L. Creps; Jeffrey G. Toler

[57] ABSTRACT

A method is disclosed of reducing data loss during cellular handoff of a mobile among base sites by detecting an end-of-line signal by a fax adapter (13a or 106a) from the transmitting fax, buffering (13b or 106b) subsequent fax information, and transmitting filler bits in place of the EOL and buffered information.

17 Claims, 1 Drawing Sheet

MINIMIZATION OF FACSIMILE DATA LOSS DURING CELLULAR HANDOVER

This is a continuation of application Ser. No. 08/117,570, filed Sep. 7, 1993 and now abandoned, which is a continuation of application Ser. No. 07/808,135, filed Dec. 16, 1991, is now abandoned.

FIELD OF THE INVENTION

This invention relates to communication systems and more specifically to cellular communication systems.

BACKGROUND OF THE INVENTION

Cellular communication systems are known. Such systems are, typically, comprised of a number of cells, each having a service coverage area, and a number of cellular telephones (communication units). The service coverage areas of adjacent cells may be arranged to partially overlap in such a manner as to provide a substantially continuous coverage area in which a communication unit receiving service from one cell may be handed off to an adjacent cell with no interruption in service. The Groupe Special Mobile (GSM) Pan-European digital cellular system, as specified in GSM recommendations available from the European Telecommunications Standards Institute (ETSI) and incorporated herein by reference, is an example of just such a system.

A cell's radio coverage is provided by a base transceiver station (BTS). Communication between a BTS and a mobile communication unit (or mobile station) (MS) typically occurs using a portion of a pair of frequencies (transmit and receive) temporarily assigned in support of the communication transaction at the BTS.

The pair of frequencies assigned for use at the remote site are typically referred to as a radio channel. Downlink transmissions (from BTS to MS) on the radio channel occur on a first frequency of the pair of frequencies. Uplink transmissions (from MS to BTS) on the radio channel occurs on the second frequency of the pair of frequencies.

The exchange of non-voice signals (e.g. facsimile or data) within the GSM system, between an MS and BTS, is also known. Such exchanges are well known and may be accomplished under well defined procedures (see GSM recommendation 3.45 for Group 3 facsimile transmissions involving MSs).

GSM recommendation 3.45 provides a means for allowing facsimile machines to interface with and transmit an information signal through the largely dissimilar, cellular network. dissimilarities addressed by the GSM recommendations range from the substantially different signalling protocols of fax machines designed for use on PSTN channels versus cellular networks involving error prone air interfaces to the analog nature of a fax signal versus the digital channels provided by GSM.

Under GSM recommendations, signalling protocols of a fax machine are converted to a GSM compatible format by a fax adapter that interconnects the fax to the mobile. In the case where a mobile fax interfaces with a PSTN fax, a protocol converter is also required at the cellular/PSTN interface. Whereas a fax machine is designed to operate via PSTN channels, a GSM specified fax adapter facilitates the same to utilize communication channels provided by GSM cellular networks.

Once a fax call is established then the line-by-line transmission of facsimile data may begin. Under CCITT recommendation T.4, a faxed line may be transmitted in as little as 5 ms or as long as 5 seconds. If the actual time of transmission takes less than 5 ms then filler bits may be added to increase the time to 5 ms. If the time is longer than 5 seconds then the receiving fax may determine that a fault exists and disconnect.

While the procedures established by GSM recommendation 3.45 may work well, problems arise during handoff of an MS among BTSs. During handoff of an MS between BTSs, signal interruptions of typically 200 ms are common. If a fax is being transmitted, and a handoff should occur then as much as 40 lines of the faxed message may be lost. Information may be lost upon handoff during the image transfer phase of a fax call because no provision is made within GSM recommendation 3.45 to avoid data loss due to handoff. Because of the importance of facsimile transmission of documents a need exists for a method of avoiding loss of data during a cellular handoff.

SUMMARY OF THE INVENTION

In a mobile cellular fax transmission a method of reducing data loss. The method includes the steps of detecting handoff and monitoring for an EOL first following handoff. Upon detection of the EOL first following handoff the method includes buffering fax information and transmitting filler bits. Upon detecting handoff completion the method includes transmitting the buffered information on a first-in-first-out basis.

DETAILED DESCRIPTION OF THE PREFERRED EMBODIMENT

The solution to the problem of data loss during handoff lies, conceptually, in sensing the receipt of a handover command, monitoring for a logical data break (e.g. end-of-line character) from the fax, and deferring transmission of fax information and the EOL character pending completion of handoff. The status of the facsimile machine is maintained during handoff by the transmission of "filler" characters comprised of "0"s. Output characters from the fax machine are buffered for transmission following completion of handoff.

Figure 1:
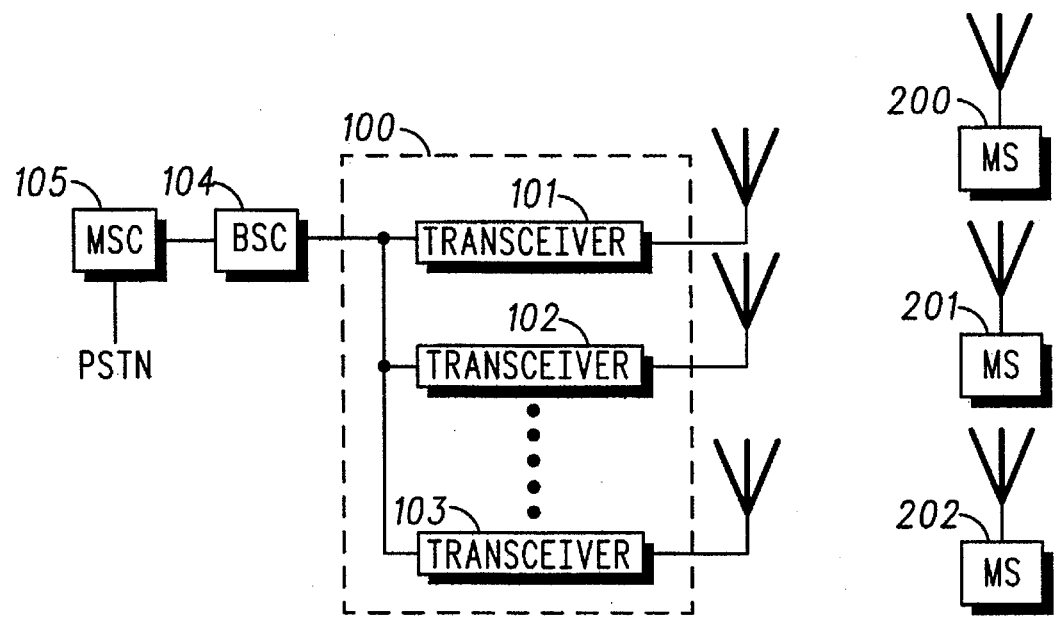
FIG. 1 comprises a block diagram of a cellular communication system with a single BTS and three MSs.

Shown in FIG. 1 is a cellular system generally, according to the invention. Included within such a system are a number of transceivers (101 to 103); together forming a base transceiver station (BTS) (100), a base site controller (BSC) (104), and a mobile system controller (MSC) (105). Also shown within the cellular system (100) are a number of mobile stations (MSs) (200, 201, and 202).

Figure 2:
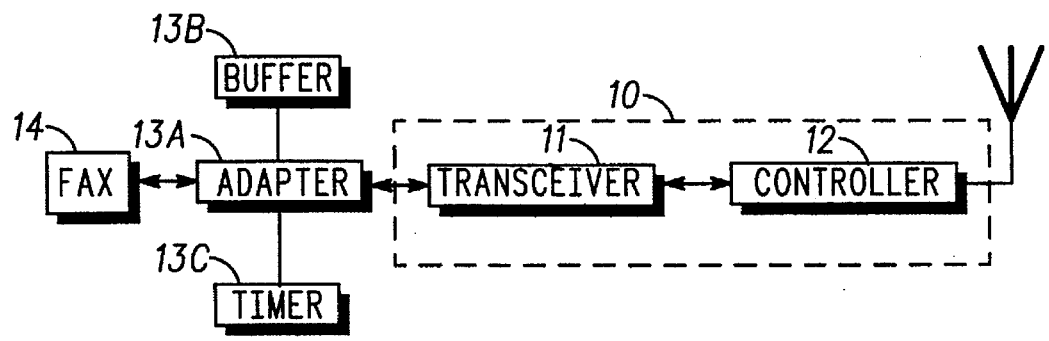
FIG. 2 comprises a block diagram of an MS with an adapter and fax machine.

MSs (200, 201, and 202) of the communication system (FIG. 1) may be adapted for transceiving fax messages by interconnection with a fax adapter and fax machine. Shown in FIG. 2 are MSs (200, 201, and 202) (each depicted, generally, within dotted line 10 as comprised of blocks 11 and 12), a fax adapter (13a), and a fax machine (14). The fax adapter (13a) is shown having a memory buffer (13b) and a timer (13c) having a time value (e.g. 500 ms) entered therein.

MSs (200, 201, and 202) are each depicted (10) as having a controller (11) and transceiver (12). Under the invention an input/output port is provided within the controller (11) for exchanging data/control messages between the fax adapter (13) and controller (11).

Following set-up of a traffic channel (TCH) between a MS (200, 201, and 202) and BTS (100), communication between faxes through a MS (200, 201, or 202) is substantially transparent to the MS (200, 201, or 202). An output signal from the fax machine (14) is a representation of each line of a faxed document consisting of a series of variable length code words. Such variable length code words are converted within the fax adapter (13) into a digital format and transmitted directly by the MS (200, 201, or 202).

Each code word (e.g. tables 1/T.4 and 2/T.4 of CCITT recommendation T4) may represent pictorial information of a portion of a line in the form of a run length of alternating, all white or all black picture elements that may be 1,728 elements long. Each line is terminated by a unique end-of-line (EOL) code word that can never be found within a valid line of data. In the case where the contents of a line of the faxed document are transmitted in less than minimum scan time (e.g. less than 5 ms) then a pause is added through the use of filler bits (consisting of a variable length string of zeros). The end of a document is communicated to a receiving fax by the transmission of six consecutive EOLs.

Under the invention a fax adapter (13a) receives control information from the BTS (100) through the interconnected MS (200, 201, or 202). Control information communicated to the fax adapter (13a) may include such things as disconnect information, handoff commands, handoff complete, etc.

Where the fax adapter (13a) is interconnected to a transmitting fax machine (14), and the fax adapter (13a) receives handoff notification from the interconnected MS (200, 201, or 202) then the fax adapter starts a timer (13c) and begins monitoring the output signal of the fax (14) for an EOL code word. Upon receipt of an EOL code word from the fax (14) the fax adapter (13a) simultaneously activates the memory buffer (13b) to record the output of the fax (14) and begins transmitting filler bits over the TCH through the MS (200, 201, or 202) thereby causing the facsimile machine to pause after printing a current line.

As the fax adapter (13a) transmits filler bits, the fax adapter (13a) continues to monitor for control information from the interconnected MS (200, 201, or 202). As a preferred method, the MS (200, 201, or 202) will send handoff complete to both the target BTS (100) as well as the fax adapter (13a). Upon receipt of a handoff complete message the fax adapter (13a) begins transmitting buffered information through the MS (200, 201, or 202) on a first-in-first-out basis.

If the time interval (measured by the timer (13c)) exceeds a threshold (the entered time value) before encountering an EOL then the adapter (13a) continues to transmit fax information, without interruption (as if a handoff had not occurred). If, on the other hand, the adapter (13a) encounters an EOL and begins buffering and transmitting filler bits, and the timer (13c) times out before handoff completion, then the adapter (13a) proceeds to perform as if it had received a handoff complete message. In such case, upon expiration of the timer (13c) the fax adapter (13a) begins transmitting buffered information from the buffer (13b), as above, on a first-in-first-out basis.

As an example, MS (200), desiring access to the system to transmit a fax document, scans for and identifies the broadcast control channel (BCCH) of the BTS (100). The MS (200) monitors for and detects information (FN, MA, and MAIO) defining a uplink communication resource over which to transmit an access request. Upon transmitting the access request the MS (200) monitors the common control channel (CCCH) on the downlink primary channel ($f_1$) for channel assignment messages.

As provided within GSM recommendations, channel assignment messages are communicated from the BTS (100) to the MS (200). These assignment messages, through suitable encoding, provide the user MS (200) with the specific parameters necessary to unambiguously determine the specific frequency and slot in which information between the BTS and MS may be exchanged.

Under the invention communication units (200, 201, and 202) and BTSs (100) are constructed to exchange signals as described above and substantially as specified under GSM. Accordingly, communication units (200, 201, and 202) request access to and are granted traffic channels (TCHs) substantially as specified under GSM recommendations.

An operator of the MS (200) may enter a telephone number of a target fax, listen for a fax tone, and activate a man-machine-interface (MMI) button to initiate a fax transmission. Alternatively an operator of the MS (200) may enter a telephone number into the interconnected fax machine (14) and activate the MMI button, thereby transmitting the target telephone number to the BTS (100) through the fax adapter (13a) and MS (200).

Use of the fax adapter (13a) to generate access requests through the MS (200) may allow for activation of special features within the cellular network such as access to simplex, one-way traffic channels. Alternatively an operator may generate an access request, converse with a target party, and then activate an MMI button on the fax adapter (thereby generating, through the fax adapter (13a) and MS (200) to the BTS (100), a request for special features such as a simplex TCH.

If during the fax transmission the BSC (104) should determine that a need to handoff is required then the BSC (104) transmits a handoff command to the MS (200). The MS (200) in turn forwards such notification to the fax adapter (13c) through the I/O port to the fax adapter (13a). The fax adapter (13a), upon detection of the impending handoff, activates the timer (13c) and begins monitoring for an EOL. Upon detecting an EOL the fax adapter (13a) begins transmitting filler bits and buffering the output of the fax (14) pending completion of handoff. Upon completion of the handoff (or time-out of the timer (13c)) the fax adapter (13a) begins transmitting the contents of the buffer (13b) on a first-in-first-out basis.

In another embodiment of the invention a stationary fax adapter function (106a, 106b, and 106c) may be provided within the MSC (105) interfacing with the public service telephone network (PSTN). The stationary adapter (106a) within the MSC (105) performs the same function as the mobile fax adapter (13a) for a fax originating within the PSTN system.

Figure 3:
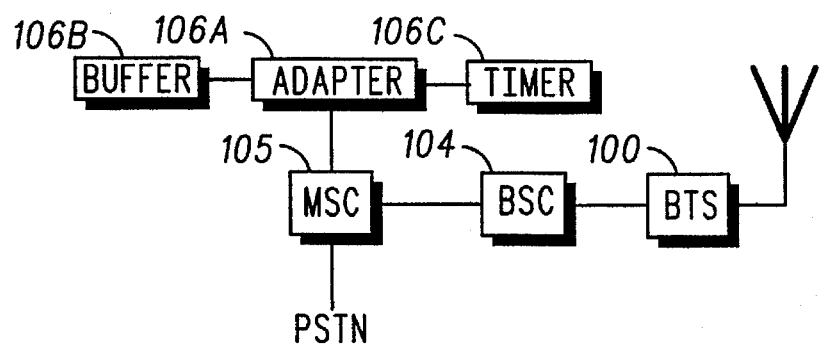
FIG. 3 comprises a block diagram of an adapter function within an MSC.

The stationary adapter (106a) may be activated upon receipt of a fax tone from the PSTN interface following assignment of a TCH from the PSTN subscriber to a MS (200, 201, or 202) target. As with the mobile adapter (13a), the stationary adapter (106a) operates substantially transparent to the system, by receiving a fax signal from the PSTN interface and transforming the input fax signal into variable length code words for transmission through the cellular system (FIG. 3) to the target MS (200, 201, or 202).

One contemplated difference with the stationary adapter (106a) is that the stationary adapter (106a) receives control information through the MSC (105) from the BSC (104) relative to a connected target MS (200, 201, or 202). As with the mobile adapter (13a) the stationary adapter (106a) monitors for handoff requests. Upon receipt of a handoff request the stationary adapter (106a) monitors for an EOL, and upon receipt of such, interrupts transmission of fax information following receipt of the EOL code word from the PSTN source. As with the mobile adapter (13a) the stationary adapter (106a) buffers the received fax information and forwards filler bits. Filler bits are transmitted simultaneously from both serving base site (100) and target base site (100) pending receipt of a handoff complete message from the BSC (104).

The stationary or mobile adapter receiving the image is also notified of the handoff through control messages. The receiving adapter may receive the fill characters with or without error. Where erroneous characters are received the adapter will encounter invalid Huffman codes and therefore replace the erroneous codes with fill characters.

In another embodiment, the invention may be applied to non-fax data exchanges (e.g. asynchronous ASCII or IA5 data transmissions) involving a data terminal (not shown) attached to an MS (200, 201, or 202) through a terminal adapter (13, or 106). Data loss provisions may be incorporated directly into the terminal adapter (13 or 106) and initiated automatically by the terminal upon activation or may be activated by an operator of a MMI button. In either case a transmitting terminal adapter (13 or 106) would transmit filler (stop) bits upon notification of handoff, and detection of a logical data break (e.g. completion of transmission of the current character), until completion of handoff. During the period of handoff the terminal adapter (13 or 106) would buffer data for later transmission. Upon completion of handoff the terminal adapter (13 or 106) would resume normal transmission of data, as above.

In another embodiment, the invention may be applied to synchronous HDLC based services. As above, the HDLC transmissions may be performed by a data terminal interconnected with an MS (200, 201, or 202) through a terminal adapter (13 or 106). Upon receipt of notification of handoff the terminal adapter (13 or 106), upon detecting a logical data break (e.g. ,end of a current frame), would transmit filler bits (flags) pending completion of handoff. The terminal adapter (13 or 106) would buffer data within memory (13b or 106b) pending completion of handoff. Following completion of handoff the terminal adapter (13 or 106) would resume transmissions as above.

In another embodiment, the invention may be applied to other cellular systems using exchange protocols similar to GSM. Examples of such systems include U.S. Digital Cellular, Japan Digital Cellular, etc.

We claim:

1. In a mobile communication system a method of reducing data loss during a facsimile transmission, such method comprising the steps of:

transmitting facsimile data over a communication channel in the mobile communication system, said facsimile data representing an image page and having a plurality of logical data breaks for each image page;

detecting hand-off and activating a timer;

monitoring for a first logical data break of the plurality of logical data breaks to be transmitted after detecting hand-off;

upon detection of the first logical data break before expiration of the timer:
   storing at least some of the facsimile data into a buffer;
   transmitting filler bits over the communication channel; and
   transmitting the data from the buffer over the communication channel upon detection of hand-off completion.

2. The method as in claim 1 wherein the step of detecting handoff comprises the step of monitoring a cellular system control commands.

3. The method as in claim 1 wherein the step of monitoring for the first logical data break comprises the step of detecting an EOL (end-of-line code) from a fax device.

4. The method as in claim 1 wherein the step of monitoring for the first logical data break comprises the step of detecting a completion of character transmission from a data terminal.

5. The method as in claim 1 wherein the step of monitoring for the first logical data break comprises the step of detecting a completion of a HDLC (high-level data link control) frame from a data terminal.

6. The method of claim 1, further comprising the step of continuing to transmit facsimile data over the communication channel upon expiration of the timer before detection of the first logical data break.

7. In a mobile communication system an apparatus for reducing data loss during a facsimile transmission, said apparatus comprising:

means for transmitting facsimile data over a communication channel in the mobile communication system, said facsimile data representing an image page and having a plurality of logical data breaks for each image page;

means for detecting hand-off and activating a timer;

means for monitoring for a first logical data break of the plurality of logical data breaks to be transmitted after detecting hand-off; and means, upon detection of the first logical data break before expiration of the timer, for:
   storing at least some of the facsimile data into a buffer;
   transmitting filler bits over the communication channel; and
   transmitting the data from the buffer over the communication channel upon detection of hand-off completion.

8. The apparatus as in claim 7 wherein the means for detecting handoff comprises means for monitoring a cellular system control commands.

9. The apparatus as in claim 7 wherein the timer further measures a time interval between handoff and an EOL (end-of-line code) first following handoff.

10. The apparatus as in claim 9 further comprising disabling means for the means for buffering and the means for transmitting upon occasion that a timer value within the timer exceeds a threshold before detection of the first logical data break.

11. The apparatus as in claim 7 wherein the means for buffering data and transmitting filler bits further comprises means for deleting an EOL (end-of-line code) from a fax transmission of the data transmission.

12. The apparatus as in claim 7 further comprising a fax adapter interconnected between an MS (mobile station) and a fax machine.

13. The apparatus as in claim 7 further comprising a fax adapter function within an MSC (mobile switching center).

14. The apparatus as in claim 7 wherein the means for detecting the first logical data break further comprises means for detecting an EOL (end-of-line code).

15. The apparatus as in claim 7 wherein the means for detecting the first logical data break comprises means for detecting completion of a current character.

16. The apparatus as in claim 7 wherein the means for detecting the first logical data break comprises means for detecting completion of a current frame.

17. A facsimile adaptor for use in a mobile communication system to reduce facsimile data loss during a facsimile data transmission from a facsimile machine, the facsimile adaptor comprising:

a hand-off signal detector receiving a hand-off command signal and a hand-off completion signal;

a data break detector coupled to the hand-off signal detector and the facsimile machine, in response to a detected hand-off command signal by the hand-off detector, detecting a first data break in the facsimile transmission, said facsimile transmission having a plurality of data breaks for each transmitted page sent by the facsimile machine, and outputting a data break signal;

a memory coupled to the facsimile machine, the hand-off signal detector and the data break detector, and storing data of the facsimile transmission following the first data break in response to the data break signal, and outputting on a first-in-first-out basis the stored data upon detection of a hand-off completion signal; and a filler bit generator in communication with the data break detector and hand-off signal detector, and transmitting filler bits upon detection of the first data break signal and ceasing transmission of the filler bits upon detection of the hand-off completion signal.

\* \* \* \* \*